(12) United States Patent  (10) Patent No.: US 6,708,713 B1
Gericke  (45) Date of Patent: Mar. 23, 2004

(54) FILL LIMIT CONTROL VALVE ASSEMBLY HAVING A LIQUID FUEL TRAP

(75) Inventor: Michael Gericke, Schomberg (CA)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 09/958,483

(22) PCT Filed: Apr. 11, 2000

(86) PCT No.: PCT/CA00/00381

§ 371 (c)(1),
(2), (4) Date: Jan. 11, 2002

(87) PCT Pub. No.: WO00/63042

PCT Pub. Date: Oct. 26, 2000

Related U.S. Application Data

(60) Provisional application No. 60/129,560, filed on Apr. 16, 1999.

(51) Int. Cl.$^7$ .............................................. F16K 24/04
(52) U.S. Cl. ......................................... 137/43; 137/202
(58) Field of Search .................................... 137/43, 202

(56) References Cited

U.S. PATENT DOCUMENTS

| | | |
|---|---|---|
| 3,152,604 A | * 10/1964 | Frye et al. ................... 137/202 |
| 3,910,302 A | 10/1975 | Sudhir |
| 4,058,149 A | 11/1977 | Hansel |
| 4,798,306 A | 1/1989 | Giacomazzi et al. |
| 4,813,453 A | 3/1989 | Jenkins et al. |
| 4,852,761 A | 8/1989 | Turner et al. |
| 4,869,283 A | 9/1989 | Oeffling et al. |
| 4,881,578 A | 11/1989 | Rich et al. |
| 4,887,578 A | 12/1989 | Woodcock et al. |
| 5,183,087 A | 2/1993 | Aubel et al. |
| 5,259,412 A | 11/1993 | Scott et al. |
| 5,282,497 A | 2/1994 | Allison |
| 5,318,069 A | 6/1994 | Harris |
| 5,388,611 A | 2/1995 | Harris |
| 5,413,137 A | 5/1995 | Gimby |
| 5,462,100 A | 10/1995 | Covert et al. |
| 5,566,705 A | 10/1996 | Harris |
| 5,590,697 A | 1/1997 | Benjey et al. |

(List continued on next page.)

Primary Examiner—Gerald A. Michalsky
(74) Attorney, Agent, or Firm—Clark Hill PLC

(57) ABSTRACT

The subject invention includes a fill limit control valve assembly (10) having a valve portion (16) and a float portion (18). The valve portion (16) includes a vent opening (28) for venting vapors from the fuel tank (12) to a vapor canister. A float (30) is movably supported by the float portion (18) for movement between an open position spaced from the vent opening (28) and a closed position seating a seal (56) against a seat (64) about the vent opening (28). A liquid fuel trap or discriminator member is disposed above the vent opening (28) to limit liquid fuel flow through an outlet connector (22). The liquid fuel trap includes a baffle barrier (32) surrounding the vent opening (28) and a return cup (34) having a base (36) overlying the baffle barrier (32) and a depending rim (38) surrounding the baffle barrier (32) for forcing the flow of vapor from the vent opening (28) through a U-turn. A stem (54) extends from the top end of the float (30) downwardly to a distal end (58). A guide disk (60) extends across the float cavity and is in sliding engagement with the stem (54) for guiding and stabilizing movement of the float (30) in the float cavity between the positions. A spring (62) reacts between the guide disk (60) and the top of the stem (54) for biasing the stem (54) toward the closed position. During a rollover situation, the float (30) fills with fuel and does not float as it is forced against the seat (64) by the spring (62). A steel ball (72) engages and forces the distal end (58) of the stem (54) upward in response to the vertical axis of the valve, i.e., the axis of the stem (54), moving to a predetermined angle with vertical.

20 Claims, 4 Drawing Sheets

U.S. PATENT DOCUMENTS

| | | |
|---|---|---|
| 5,592,963 A | 1/1997 | Bucci et al. |
| 5,687,778 A | 11/1997 | Harris |
| 5,694,968 A | 12/1997 | Devall et al. |
| 5,749,347 A | 5/1998 | Torii et al. |
| 5,762,093 A * | 6/1998 | Whitley, II ............... 137/202 |
| 5,782,258 A | 7/1998 | Herbon et al. |
| 5,797,434 A | 8/1998 | Benjey et al. |
| 5,809,976 A | 9/1998 | Cook et al. |
| 5,836,341 A | 11/1998 | Ayers et al. |
| 5,860,458 A | 1/1999 | Benjey et al. |
| 5,878,725 A | 3/1999 | Osterbrink |
| 5,950,655 A | 9/1999 | Benjey |

* cited by examiner

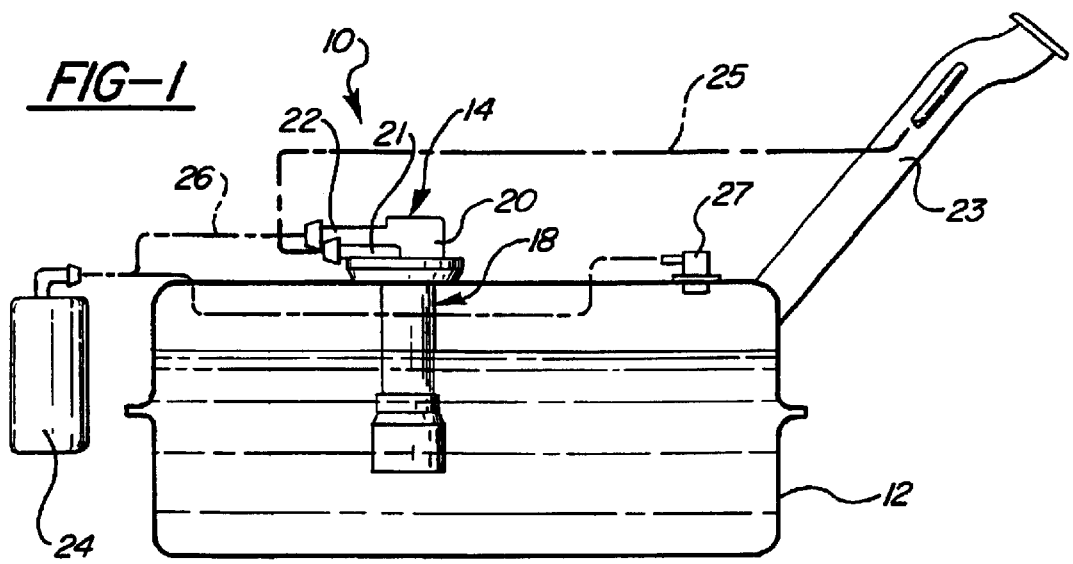
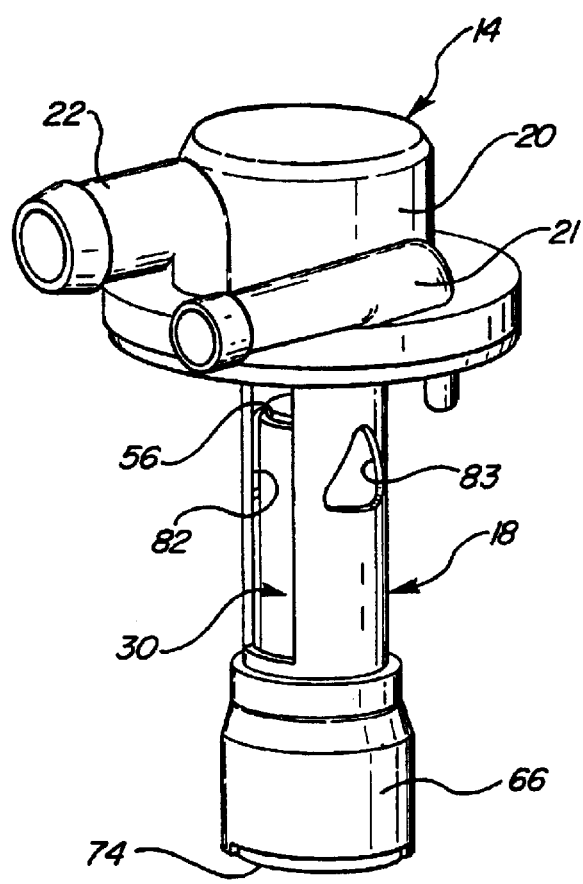

FILL LIMIT CONTROL VALVE ASSEMBLY HAVING A LIQUID FUEL TRAP

RELATED APPLICATIONS

This application is the U.S. national stage of PCT/CA00/00381, filed Apr. 11, 2000, which claims the benefit of U.S. provisional application Serial No. 60/129,560, filed Apr. 16, 1999.

FIELD OF THE INVENTION

The present invention relates to a valve which controls the fuel level, the venting and traps fuel vapors from an automotive vehicle fuel tank to a fuel canister, or the like, and which prevents escape of liquid fuel from the fuel tank in the event of rollover of the vehicle.

BACKGROUND OF THE INVENTION

A fill limit control valve, which is normally disposed in a vehicle fuel tank, frequently comprises a housing having a valve portion for sealing engagement about a hole in a fuel tank and a float portion extending into the fuel tank. The type of valve to which the subject invention pertains responds to the level of liquid fuel in the fuel tank, staying open to vent vapor as long as the fuel level is below a predetermined level. These are sometimes referred to as "fill control" or "shutoff" valves, since closing thereof creates a sudden pressure increase in the tank thereby preventing further refueling.

The valve portion defines a vent opening for venting vapors from the fuel tank and a vapor outlet for conveying fuel vapors to a vapor canister. A float is movably supported by the float portion for seating against and closing the vent opening in response to the float rising to a predetermined fuel level. Examples of such prior art assemblies are shown in U.S. Pat. Nos. 5,590,697 to Benjey et al. and U.S. Pat. No. 5,860,458 to Benjey et al.

Sometimes these valves are supplemented with a gravity-responsive rollover device supported at the bottom of the float portion for engaging and moving the float upwardly to seal the vent opening in response to a predetermined amount of deviation from vertical, e.g., a rollover. An example of such a prior art assembly is shown in U.S. Pat. No. 5,809,976 to Cook et al.

Although all of these assemblies may perform satisfactorily, liquid fuel may inadvertently pass through the valve and into the vapor canister. Influx of liquid into the vapor canister, can prematurely saturate the canister and pollute the environment. Hence, there remains a need to reduce and virtually eliminate the amount of liquid fuel that passes out of the valve during normal operation.

SUMMARY OF THE INVENTION

The disadvantages of the prior art may be overcome by providing a fill limit control valve assembly disposed in a vehicle fuel tank. The fill limit control valve assembly has a housing having a valve portion for connection to a fuel tank and a float portion for extending into the fuel tank. The valve portion defines a vent opening for venting vapors from the fuel tank. A float is movably supported by the float portion for movement between an open position spaced from the vent opening and a closed position seating against and sealing the vent opening in response to the float rising to a predetermined fuel level. A liquid fuel trap is disposed above the vent opening to limit liquid fuel flow through the vapor outlet.

Accordingly, the subject invention provides a fill limit control valve that mininmizes and virtually eliminates the undesirable flow of liquid fuel into a vapor canister. Hence, only fuel vapors pass through the valve and into the canister.

According to another aspect of the invention, there is provided a fill limit control valve assembly having a float which traps vapor during normal fuel filling to enable the float to become buoyant and responsively move to a closed position and which collects liquid fuel when in an inverted rollover condition to prevent buoyancy and responsively move to the closed position.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an environmental view showing the subject invention combined with an automotive vehicle fuel tank;

FIG. 2 is perspective view of a fill limit control valve in accordance with the subject invention;

DETAILED DESCRIPTION OF THE PREFERRED EMBODIMENT

Figure 3:
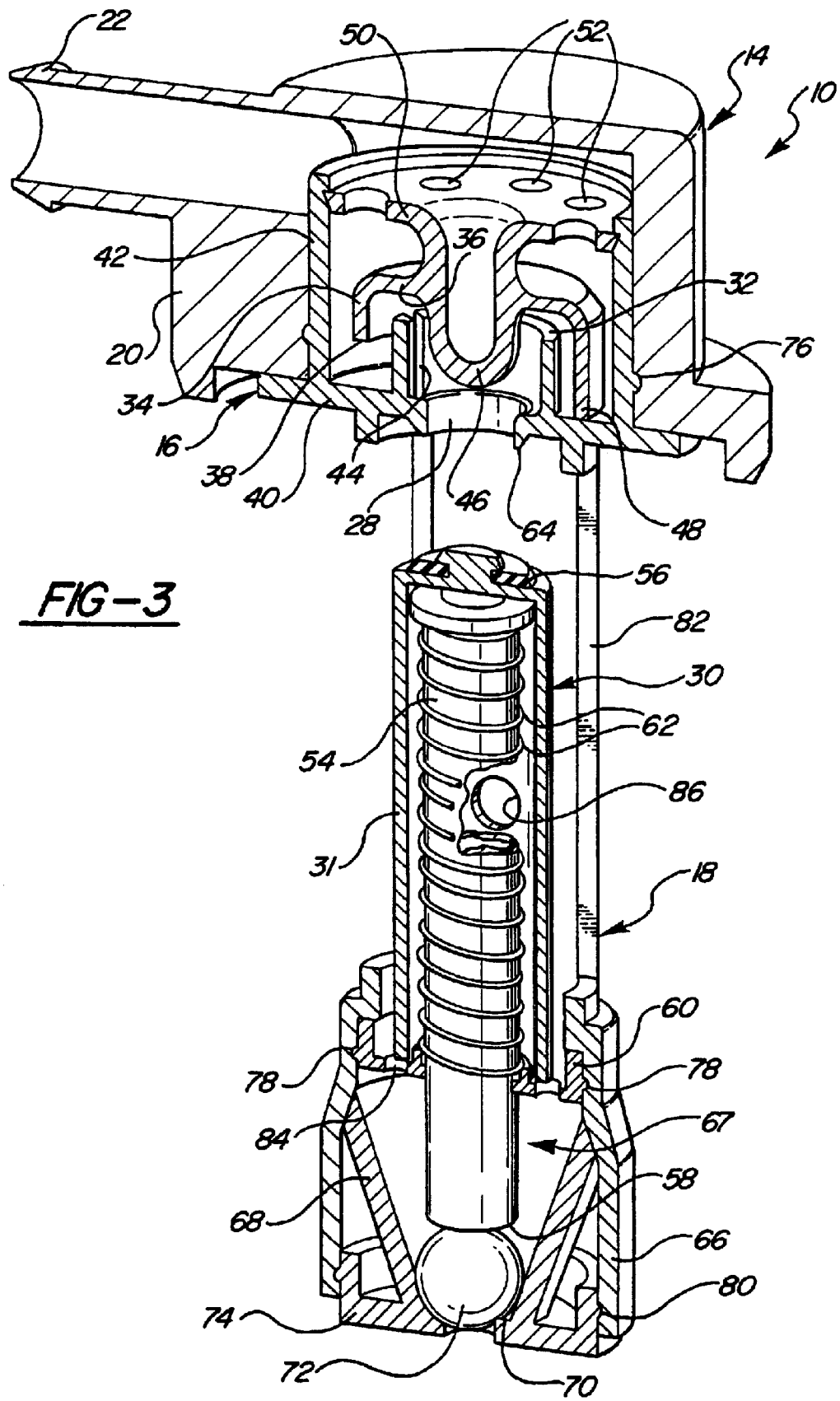
FIG. 3 is an enlarged perspective view in cross section of the subject valve in an open position.

Referring to the Figures, wherein like numerals indicate like or corresponding parts throughout the several views, a fill limit control valve assembly is generally shown at 10 disposed within a vehicle fuel tank 12 in FIG. 1.

The valve assembly 10 includes a housing, generally indicated at 14, having a float portion, generally indicated at 18, adapted for extending into the fuel tank 12. The housing 14 includes a mounting cap 20 defining a vapor outlet connector 22 for conveying vapors to a vapor canister 24 via line 26. A recirculation pipe 21 is also provided on the cap 20 for recirculating vapors into a filler neck 23 via a second line 25. In addition, a rollover valve 27 may be mounted to the fuel tank 12 and connected to the vapor canister 24 as is known in the art.

The mounting cap 20 has a mounting face which abuts the fuel tank 12 to secure the valve assembly 10 to the fuel tank 12 in any suitable manner. The vapor canister 24, which is typically a carbon canister, rollover valve 27, and fuel tank 12 are of any suitable design as is known in the art. For illustrative purposes, the lines 25,26 are shown schematically.

Referring to FIG. 2, the float portion 18 is a cylindrical column and includes a float 30 movably supported therein. The float portion 18 defines a number of openings 82, 83 for providing fluid communication between the fuel tank 12 and the float 30. As illustrated, the openings 82 have a rectangular configuration and opening 83 has a triangular configuration. Preferably there are two rectangular openings 82 and two triangular openings 83 diametrically opposed on the float portion 18.

Figure 4:
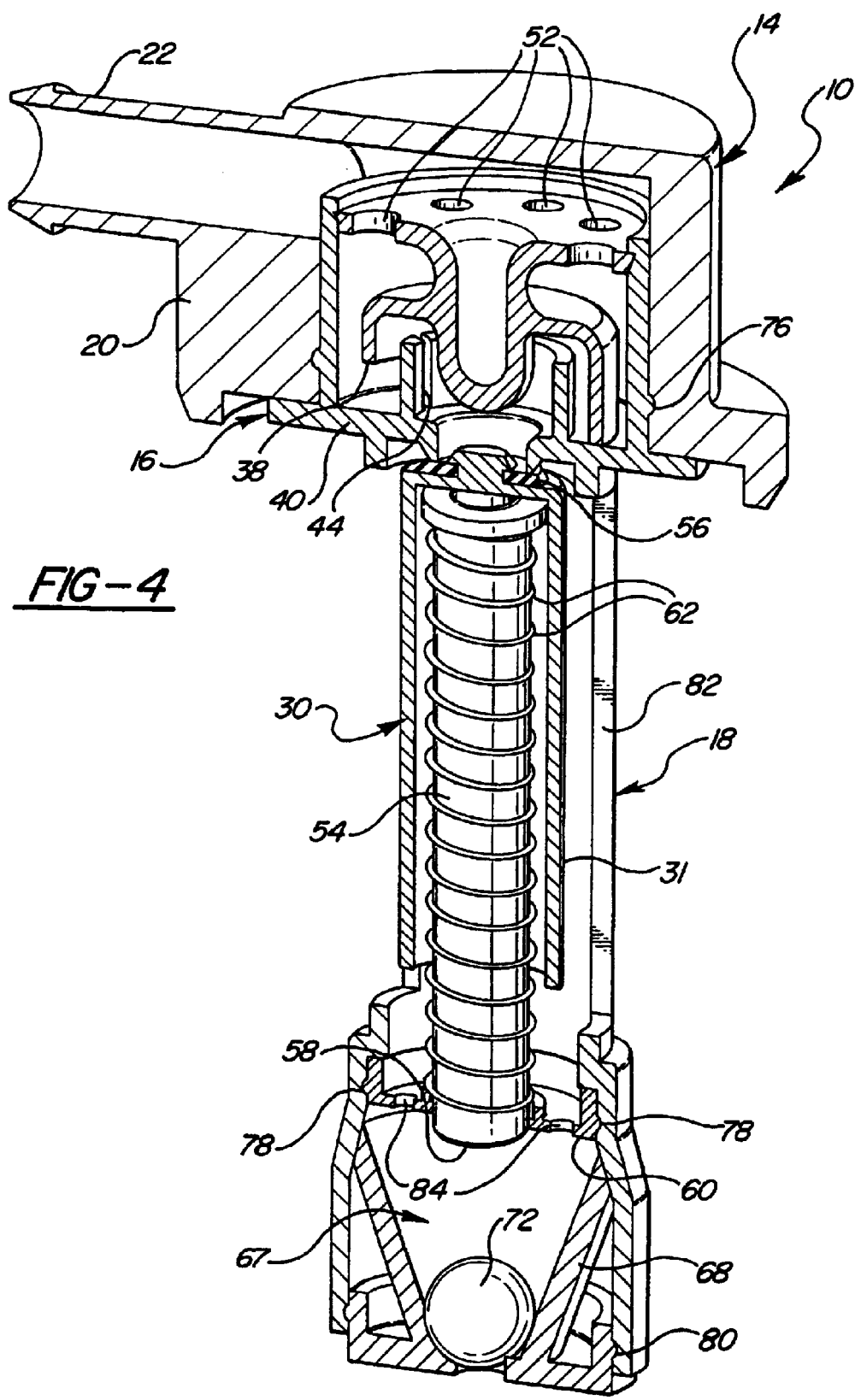
FIG. 4 is an enlarged perspective view in cross section of the subject valve in a closed position.

Referring to FIGS. 3 and 4, the valve assembly 10 also includes a valve portion 16, adapted for connection to the fuel tank 12. The mounting cap 20 encompasses at least a portion of the valve portion 16. The valve portion 16 defines a vent opening 28 for venting vapors from the fuel tank 12 to the vapor canister 24 via outlet connector 22 and line 26.

The valve assembly 10 is characterized by a liquid fuel trap disposed above the vent opening 28 to limit liquid fuel flow through the outlet connector 22. The fuel trap includes a baffle barrier 32 surrounding the vent opening 28. A return cup 34 having a base 36 overlies the baffle barrier 32 with a depending rim 38 surrounding the baffle barrier 32 for forcing the flow of vapor from the vent opening 28 through a U-turn. The return cup 34 includes legs 48 extending downwardly from the rim 38 to support the fuel trap in the valve portion 16. The return cup 34 also includes a bullet 46 extending from the base 36 thereof and into the baffle barrier 32 to define an annular passage for dividing the flow of vapors from the vent opening 28. The bullet 46 extends above the base 36 of the return cup 34 and an annular flange 50 extends radially of the bullet 46. The flange 50 has passages 52 therethrough for the passage of vapors through the flange 50. The return cup 34, base 36, bullet 46, legs 48, and flange 50 preferably define an integral discriminator member. The discriminator member preferably is formed of a homogeneous organic polymeric material. As appreciated, the discriminator member may include multiple separate parts and may be formed of any suitable material.

The valve portion 16 includes a bottom 40 supporting the baffle barrier 32 and defining the vent opening 28. The bottom 40 of the integral casing defines an annular valve seat 64 extending or projecting downwardly. An outer wall 42 extends from the bottom 40 and is spaced from and surrounds the rim 38 for defining a collection reservoir for liquid fuel. The baffle barrier 32 includes drain holes 44 for draining liquid from the reservoir back through the vent opening 28. The baffle barrier 32, bottom 40 and outer wall 42 are all defined by an integral casing, preferably formed of an organic polymeric material. The integral casing may include multiple separate parts and may be formed of any suitable material.

The legs 48 of the return cup 34 extending downwardly to the bottom 40 for supporting the return cup 34, as well as the entire discriminator member, on the bottom 40. The annular flange 50 engages the outer wall 42 to further support the discriminator member to the wall 42 of the valve portion 16.

The mounting cap 20 surrounds the outer wall 42 of the casing and defines the vapor outlet connector 22 for conveying vapors from the passages 52 in the annular flange 50 of the discriminator member. The integral casing and the cap 20 include a first tongue and groove connection 76 interconnecting the integral casing and the cap 20.

The float portion 18 defines a float cavity in which the float 30 is vertically movable between an open position spaced from the vent opening 28 and a closed position seating against and sealing the vent opening 28. The float cavity is defined by an extension of the integral casing which extends downwardly from the bottom 40. The float 30 includes a buoyant cylindrical section 31 having a closed top end connected to the top of a stem or shaft 54. The cylindrical section 31 is hollow with an open lower end and includes diametrically opposed openings 86 for allowing liquid to pass into a hollow interior of the cylindrical section 31. Openings 86 are spaced from the closed upper end of cylindrical section 31 so that a vapor chamber is defined having a sufficient volume to enable the float 30 to float in response to the filling liquid fuel.

A valve seal 56 is secured to the upper closed end of the cylindrical section 31 for sealing engagement with the vent opening 28 to close the float 30 when in the closed position. As illustrated, the seal 56 is flexible and snapped into engagement with a button integral with the top end of the cylindrical section 31. Preferably, the seal 56 engages the valve seat 64, which extends into the float cavity. The stem 54 extends from the top end of the cylindrical section 31 of the float 30 downwardly to a lower end 58.

A guide disk 60 extends about the lower end of the float cavity and has an opening receiving the stem 54 for guiding and stabilizing movement of the float 30 in the float cavity. The guide disk 60 includes openings 84 for allowing liquid to pass therethrough between the funnel-shaped element 68 and the float cavity. A spring 62 acts between the guide disk 60 and the top of the stem 54 for biasing the stem 54, as well as the entire float 30, toward the closed position.

Figure 5:
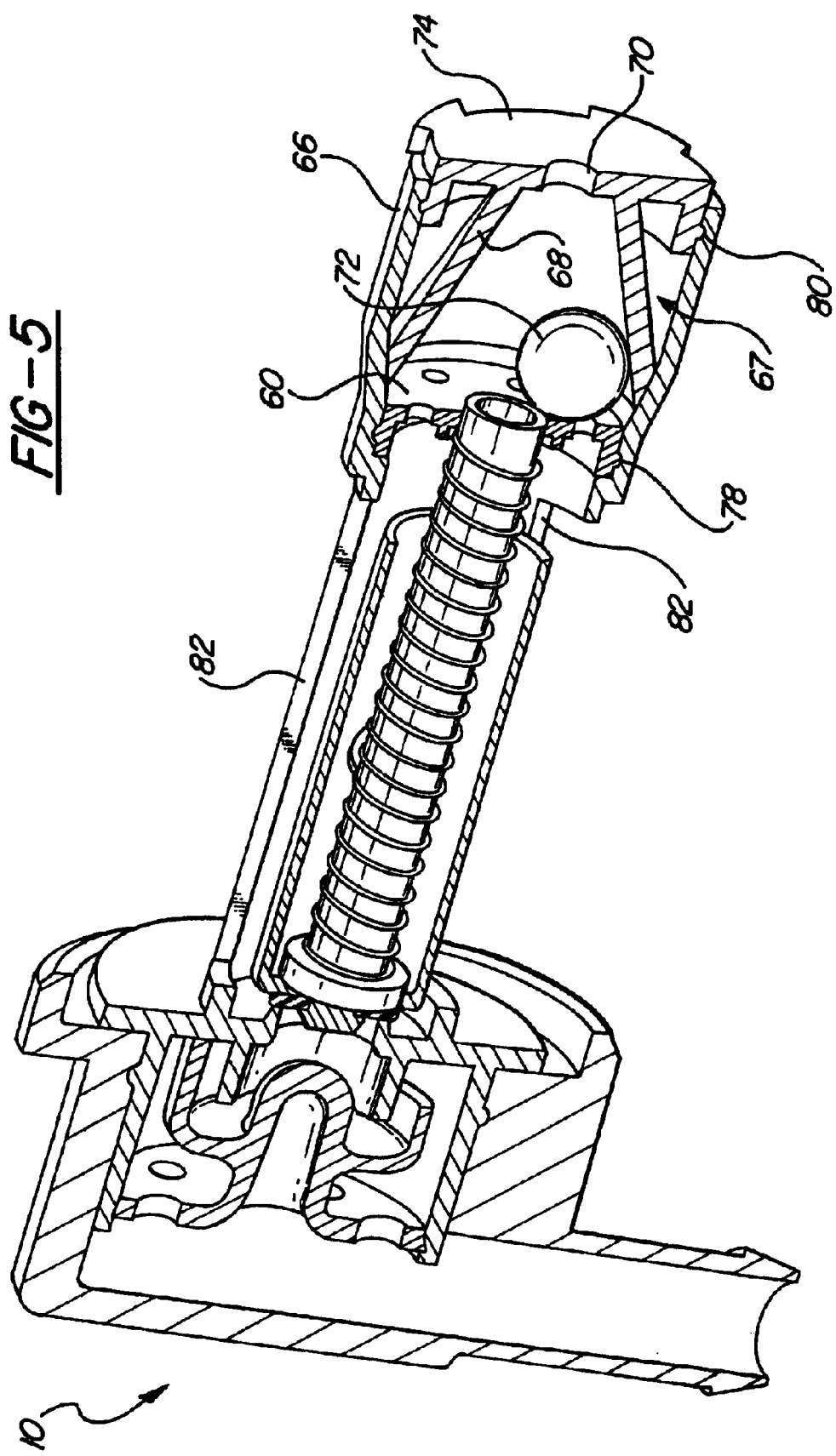
FIG. 5 is an enlarged perspective view in cross section of the subject valve in a closed and rollover position

Referring also to FIG. 5, a skirt 66 depends from the float portion 18 of the integral casing. A gravity responsive device 67 is supported in the skirt 66 of the float portion 18. The gravity responsive device 67 is supported below the guide disk 60 for engaging the distal end 58 of the stem 54 and for moving the float 30 upwardly to seal with the seat 64 and close the vent opening 28 in response to a predetermined amount of deviation from vertical.

The gravity responsive device 67 includes a funnel shaped element 68 extending from a large diameter adjacent the guide disk 60 to a small diameter at the bottom thereof A ball-seat opening 70 is defined in the small diameter and a ball 72, preferably made of steel, is normally disposed over the ball-seat opening 70. A support wheel 74 extends radially from the small diameter to engage the skirt 66 to support the funnel-shaped element 68 in the skirt 66. The guide disk 60 is also supported in the skirt 66. A second tongue and groove connection 78 interconnects the disk 60 and the skirt 66. The wheel 74 and the funnel-shaped element 68 are integral and consist of an organic polymeric material and include a third tongue and groove connection 80 interconnecting the wheel 74 and the skirt 66.

The invention provides a fill limit control valve assembly with an integrated liquid/vapor discriminator member. During normal refilling of the fuel tank 12, the fuel level in the tank 12 rises and vapor is displaced. This causes a constant vapor flow to the canister 24. In particular, the vapors pass through the openings 82 and upwardly through the float cavity. The vapors then pass through the vent opening 28 and are then diverted by the bullet 46. The vapors pass over the baffle barrier 32 between the barrier 32 and base 36. The vapors are forced to complete a U-turn by the depending rim 38. The vapors then continue upward through the passages 52 in the flange 50 and out through the connector 22 and into the vapor canister 24. The vapors are purified by the canister 24 and exhausted to the atmosphere.

The baffle barrier 32, in conjunction with the return cup 34, condenses fuel and fuel mist that travels with the vapor flow and retains any liquid in the reservoir established between the wall 42 and the baffle barrier 32. As appreciated, a small amount of fuel mist and/or liquid may become trapped in the reservoir. This retained mist and/or liquid drains back into the tank 12 through the drain holes or slits 44 in the baffle barrier 32 once the vent opening 28 is reopened.

During normal filling of the fuel tank 12, at least a portion of the liquid fuel also passes through the openings 82 and into the float cavity. The liquid fuel also passes through openings 84 in the guide disk 60 such that liquid fuel is accumulating below and within the float 30. In particular, liquid fuel is disposed between the stem 54 and the cylindrical section 31. The displaced vapor within the float 30 passes out of opening 86 within the cylindrical section 31. This process continues until the level of liquid fuel within the fuel tank 12 reaches the level above the opening 86 in the cylindrical section 31. At this point, no additional vapors can pass through the opening 86 and the vapors disposed between the top of the cylindrical section 31 and the opening 86 are trapped within the upper end of the hollow interior of the cylindrical section 31, thereby increasing the buoyancy of the float 30 allowing the float 30 to move responsively upwardly to the closed position.

As the level of liquid in the fuel tank 12 continues to rise, the float 30 will move from the open position, as shown in FIG. 3, to the closed position, as shown in FIG. 4. The upward movement of the float 30 occurs because of the buoyancy of the float 30, created by the trapped vapor, in relation to the rising liquid and the upward pushing force from the spring 62. Hence, when a predetermined level of fuel in the tank 12 is reached, the float 30 completely rises and, with the assistance of the spring 62, seals the seat 64 with the seal 56. The float 30 is therefore movably supported by the float portion 18 for moving to the closed position seating against and sealing the vent opening 28 in response to the float 30 rising to a predetermined fuel level, i.e., full.

Upon closure of the vent opening 28, the fuel tank 12 no longer has an exhaust avenue for the vapor such that pressure builds up in the tank 12 and corresponding filler neck 23. This pressure build-up triggers the filling nozzle to shut off and stops the refilling of the fuel tank 12.

As the liquid fuel in the fuel tank 12 is used, the level of liquid fuel will lower which subsequently lowers the float 30 within the float cavity. As appreciated, the liquid fuel will flow out of the float cavity through the openings 82. When the float 30 lowers, the vent opening 28 is reopened such that any trapped mist and liquid can flow back into the float cavity through the drain holes 44. The surface tension of the fuel in the float 30 would cause the fuel to remain in the cylindrical float 30 except that the stem 54 helps to purge the fuel by breaking this surface tension.

During a vehicle rollover, the steel ball 72 will disengage from the ball-seat opening 70. Preferably, the steel ball 72 starts to roll out of the normal position when the vehicle is tilted more than 70°. As the steel ball 72 moves upward along the funnel-shaped element, the ball 72 engages the distal end 58 of the stem 54 to push the stem 54 into the closed position sealing the fuel tank 12. As appreciated, the ball 72 may be of any suitable design, material and weight so long as the stem 54 is adequately pushed upward against the valve seat 64. During the rollover, the cylindrical section 31 of float 30 will be in an inverted condition and will therefore fill with liquid fuel such that the float 30 is no longer buoyant. The float 30 is responsively forced to the closed position, against the valve seat 64 by the spring 62 preventing fuel from passing through opening 28.

Many modifications and variations of the present invention are possible in light of the above teachings. The invention may be practiced otherwise than as specifically described within the scope of the appended claims.

What is claimed is:

1. A fill limit control valve assembly (10) adapted for disposition in a vehicle fuel tank (12), said valve assembly (10) comprising;
   a housing (14) having a valve portion (16) with an outlet connector (22) adapted for connection to a fuel tank (12) and a float portion (18) for extending into the fuel tank (12),
   said valve portion (16) defining a vent opening (28) for venting vapors from the fuel tank (12),
   a float (30) movably supported by said float portion (18) for movement between an open position spaced from said vent opening (28) and a closed position seating against and sealing said vent opening (28), and
   a liquid fuel trap disposed above said vent opening (28) to limit liquid fuel flow therethrough to said outlet connector (22),
   said liquid fuel trap including a baffle barrier (32) surrounding said vent opening (28), and a return cup (34) having a base (36) overlying said baffle barrier (32) with a dependent rim (38) surrounding said baffle barrier (32) for forcing the flow of said vapors from said vent opening (28) through a U-turn, and legs (48) extending downwardly from said rim (38) to support said liquid fuel trap in said valve portion (16),
   wherein said valve portion (16) includes a bottom (40) supporting said baffle barrier (32) and defining said vent opening (28) and an outer wall (42) extending from said bottom (40) and spaced from and surrounding said rim (38) for defining a collection reservoir below said rim (38), said baffle barrier includes drain holes (44) for draining liquid from said reservoir back through said vent opening (28), and said return cup (34) includes a bullet (46) extending from said base (36) thereof and into said baffle barrier (32) to define an annular passage for dividing said vapor flow from said vent opening (28).

2. An assembly as set forth in claim 1 further including legs (48) extending downwardly from said rim (38) to said bottom (40) for supporting said return cup (34) on said bottom (40).

3. An assembly as set forth in claim 2 wherein said bullet (46) extends above said base (36) of said return cup (34) and including an annular flange (50) extending radially of said bullet (46) to engage said outer wall (42), said flange (50) defining passages (52) therethrough for the passage of said vapors through said flange (50).

4. An assembly as set forth in claim 3 wherein said float portion (18) defines a float cavity in which said float (30) is vertically movable between said open and closed positions, said float (30) includes a cylindrical section (31) which traps vapor during normal fuel filling to enable the float (30) to responsively move to the closed position and which collects liquid fuel when in an inverted rollover condition to responsively move to the closed position.

5. An assembly as set forth in claim 4 wherein said float (30) further including a valve seal (56) at a top end for sealing engagement with said vent opening (28) to close same when in said closed position, a stem (54) extending from said top end of said float (30) downwardly to a distal end (58).

6. An assembly as set forth in claim 5 further including a guide disk (60) extending across said float cavity and in sliding engagement with said stem (54) for guiding and stabilizing said movement of said float (30) in said float cavity between said positions.

7. An assembly as set forth in claim 6 wherein said valve seal (56) is supported on said top of said buoyant cylindrical section (31).

8. An assembly as set forth in claim 7 further including a gravity responsive device (67) supported by said float portion (18) below said guide disk (60) for engaging said distal end (58) of said stem (54) and for moving said float (30) upwardly to seal said vent opening (28) in response to a predetermined amount of deviation from vertical.

9. An assembly as set forth in claim 8 further including a spring (62) reacting between said guide disk (60) and said top of said stem (54) for biasing said stem (54) toward said closed position.

10. An assembly as set forth in claim 9 wherein said baffle barrier (32), said bottom (40) and said outer wall (42) define an integral casing.

11. An assembly as set forth in claim 10 wherein said return cup (34), said base (36), said bullet (46), said legs (48), and said flange (50) define an integral discriminator member.

12. An assembly as set forth in claim 11 wherein said housing (14) includes a mounting cap (20) surrounding said outer wall (42) of said casing and defining said outlet connector (22) for conveying said vapors from said annular flange (50) of said discriminator member.

13. An assembly as set forth in claim 12 wherein said bottom (40) of said integral casing defines an annular valve seat (64) extending downwardly into said float cavity.

14. An assembly as set forth in claim 13 wherein said integral casing extends downwardly from said bottom (40) to further define said float cavity with a skirt (66) depending therefrom.

15. An assembly as set forth in claim 14 wherein said gravity responsive device (67) is supported in said skirt (66).

16. An assembly as set forth in claim 15 wherein said gravity responsive device (67) includes a funnel-shaped element (68) extending from a large diameter adjacent said guide disk (60) to a small diameter, a ball-seat opening (70) in said small diameter, and a ball (72) normally disposed over said ball-seat opening (70).

17. An assembly as set forth in claim 16 wherein said guide disk (60) is supported in said skirt (66).

18. An assembly as set forth in claim 17 including a support wheel (74) extending radially from said small diameter to engage said skirt (66) to support said funnel-shaped element (68) in said skirt (66).

19. An assembly as set forth in claim 18 wherein said float portion (18) includes openings (82) for allowing liquid to pass therethrough from the fuel tank (12) into said float cavity, said guide disk (60) includes openings (84) for allowing liquid to pass therethrough from said funnel-shaped element (68) to said float cavity, and said buoyant cylindrical section (31) being hollow with an open distal end and including openings (86) for allowing liquid to pass into a hollow interior of said buoyant cylindrical section (31).

20. An assembly as set forth in claim 19 wherein said integral casing and said cap (20) consist of an organic polymeric material and including a first tongue and groove connection (76) interconnecting said integral casing and said cap (20), said disk (60) consisting of an organic polymeric material and including a second tongue and groove connection (78) interconnecting said disk (60) and said skirt (66), said wheel (74) and said funnel-shaped element (68) being integral and consisting of an organic polymeric material and including a third tongue and groove connection (80) interconnecting said wheel (74) and said skirt (66).

* * * * *